United States Patent
Hennebelle et al.

(10) Patent No.: US 9,746,035 B2
(45) Date of Patent: Aug. 29, 2017

(54) DAMPER FOR MOTOR VEHICLE TORQUE TRANSMISSION DEVICE

(71) Applicant: VALEO EMBRAYAGES, Amiens (FR)

(72) Inventors: Michael Hennebelle, Houdain (FR); Roel Verhoog, Gournay sur Aronde (FR)

(73) Assignee: Valeo Embrayages (FR)

( * ) Notice: Subject to any disclaimer, the term of this patent is extended or adjusted under 35 U.S.C. 154(b) by 0 days.

(21) Appl. No.: 14/792,175

(22) Filed: Jul. 6, 2015

(65) Prior Publication Data

US 2016/0010697 A1   Jan. 14, 2016

(30) Foreign Application Priority Data

Jul. 11, 2014 (FR) ...................... 14 56726

(51) Int. Cl.
| | |
|---|---|
| *F16D 3/14* | (2006.01) |
| *F16F 15/123* | (2006.01) |
| *F16H 45/02* | (2006.01) |
| *F16H 41/24* | (2006.01) |

(Continued)

(52) U.S. Cl.
CPC .......... *F16D 3/14* (2013.01); *F16F 15/12306* (2013.01); *F16F 15/12373* (2013.01); *F16H 41/24* (2013.01); *F16H 45/02* (2013.01); *F16F 15/13492* (2013.01); *F16F 15/145* (2013.01); *F16H 2045/0226* (2013.01)

(58) Field of Classification Search
CPC . F16D 3/14; F16F 15/12306; F16F 15/12373; F16F 15/145; F16F 15/13492; F16H 2045/0226; F16H 41/24; F16H 45/02
See application file for complete search history.

(56) References Cited

U.S. PATENT DOCUMENTS 1,693,765 A * 12/1928 Parsons ..................... F16D 3/14
                                                     464/48
2,364,988 A * 12/1944 McFarland ............... F16D 3/14
                                                   192/70.17

(Continued)

FOREIGN PATENT DOCUMENTS

| EP | 0093287 | 11/1983 |
|---|---|---|
| EP | 0093287 A1 | 11/1983 |

(Continued)

*Primary Examiner* — David J Hlavka
(74) *Attorney, Agent, or Firm* — Berenato & White, LLC

(57) ABSTRACT

A damper for a motor vehicle torque transmission device, in particular of the long travel damper type, having a torque input element (22), a torque output element (28), at least one group (26) of differing elastic members (26*a*, 26*b*) mounted between the torque input element and torque output element and acting oppositely to the rotation of the torque input element (22) and torque output element (28) with respect to one another, the elastic members (26*a*, 26*b*) of the group of elastic members being arranged in series by means of a phasing member (30) so that the elastic members (26*a*, 26*b*) of the group (26) of elastic members deform in phase with one another, the group (26) of elastic members (26*a*, 26*b*) being received in a receptacle (44) that is asymmetrical with respect to a median radial plane of the receptacle (44).

25 Claims, 3 Drawing Sheets

(51) Int. Cl.
*F16F 15/134* (2006.01)
*F16F 15/14* (2006.01)

(56) References Cited

U.S. PATENT DOCUMENTS

| | | | | |
|---|---|---|---|---|
| 2,853,862 A * | 9/1958 | Vincent | ............... | F16D 3/14 |
| | | | | 192/70.17 |
| 5,857,552 A * | 1/1999 | Hashimoto | ....... | F16F 15/12313 |
| | | | | 192/212 |
| 6,257,089 B1 * | 7/2001 | Hashimoto | ......... | F16F 15/1238 |
| | | | | 192/213.12 |
| 7,886,887 B2 * | 2/2011 | Bassett | ................. | F16D 43/10 |
| | | | | 192/105 CP |
| 8,978,861 B2 * | 3/2015 | Bibby | ................. | F16F 15/123 |
| | | | | 192/203 |
| 2003/0085097 A1* | 5/2003 | Uehara | ............ | F16F 15/12373 |
| | | | | 192/213.22 |
| 2003/0226734 A1* | 12/2003 | Uehara | ............... | F16F 15/1238 |
| | | | | 192/70.17 |
| 2011/0287844 A1* | 11/2011 | Steinberger | ....... | F16F 15/13492 |
| | | | | 464/68.8 |
| 2012/0046114 A1* | 2/2012 | Doman | .................... | F16D 3/14 |
| | | | | 464/45 |
| 2013/0256088 A1* | 10/2013 | Tanaka | .................... | F16D 13/58 |
| | | | | 192/203 |
| 2014/0374210 A1* | 12/2014 | Gurses | ..................... | F16D 3/12 |
| | | | | 192/70.11 |

FOREIGN PATENT DOCUMENTS

| | | |
|---|---|---|
| FR | 2947025 | 12/2010 |
| FR | 2947025 A1 | 12/2010 |
| FR | 2988455 | 9/2013 |
| FR | 2988455 A1 | 9/2013 |
| WO | 2013140082 A1 | 9/2013 |

* cited by examiner

DAMPER FOR MOTOR VEHICLE TORQUE TRANSMISSION DEVICE

CROSS-REFERENCE TO RELATED APPLICATIONS AND CLAIM TO PRIORITY

This application claims priority to Patent Application No. 1456726 filed Jul. 11, 2014 in France, the disclosure of which is incorporated herein by reference and to which priority is claimed.

FIELD OF THE INVENTION

The invention relates to a damper for a motor vehicle torque transmission device, and to a motor vehicle torque transmission device having such a damper.

BACKGROUND OF THE INVENTION

A damper for a motor vehicle torque transmission device is described, for example, in Applications FR-A-2 947 025 or FR-A-2 988 455 in the name of the Applicant. It allows the transmission of torsional vibrations from the engine output shaft to the gearbox input shaft to be limited.

In known fashion, a damper of this kind has a torque input element, a torque output element, and elastic members mounted between the torque input element and torque output element and acting oppositely to the rotation of the torque input element and torque output element with respect to one another.

When the damper is of the long-travel type (LTD), it comprises several elastic members arranged in groups, the elastic members of one group being arranged in series by means of a phasing member, so that the elastic members of each group deform in phase with one another. The elastic members of a single group can be identical or can have differing characteristics, in particular in terms of length or stiffness.

The phasing member can, during operation, compress the elastic members both in the rotation direction, called the "forward" direction, and in the opposite rotation direction, called the "reverse" direction. The forward direction corresponds to the operating situation in which a torque is transmitted from the torque input element to the torque output element. In certain operating phases, for example when the user abruptly lifts his or her foot off the accelerator, a resistance torque is transmitted from the torque output element to the torque input element, which can cause the phasing member to rotate in the "reverse" direction.

Compression of the elastic members by the phasing member can then cause slippage of the elastic members with respect to the torque input element and/or torque output element. This slippage causes hysteresis effects in the transmission of torque by the damper. Such slippage can also cause premature wear of the elastic members due to friction against the torque input member and/or torque output member.

SUMMARY OF THE INVENTION

The object of the present invention is to propose an improved damper for a motor vehicle torque transmission device, which does not exhibit the disadvantages of the existing art or at least limits their effects.

Also known, from EP-A-0 093 287, is a friction disk for a clutch comprising differing springs received windows of differing shapes in the friction disk. The windows comprise in particular a radially inner side that is rectilinear. The differing springs make it possible in particular to adapt the stiffness and the vibration attenuation effect to differing load states of the clutch.

What is proposed in order to achieve the object of the invention is a damper for a motor vehicle torque transmission device having a torque input element, a torque output element, at least one group of differing elastic members mounted between the torque input element and torque output element and acting oppositely to the rotation of the torque input element and torque output element with respect to one another, the elastic members of the group of elastic members being arranged in series by means of a phasing member so that the elastic members of the group of elastic members deform in phase with one another, the group of elastic members being received in a receptacle that is asymmetrical with respect to a median radial plane of the receptacle.

The receptacle receiving the elastic members can thus, advantageously, be configured to ensure satisfactory guidance of each of the elastic members, whereas in the existing art only one elastic member per group was appropriately guided, generally the longest or the widest.

In other words, according to the invention there is assurance that all the elastic members of one group of elastic members are in proximity to the inner face of the receptacle along the entire length of the receptacle. More specifically, according to an aspect of the invention there is assurance that the distance measured between the inner face of the receptacle and an outer periphery of each of the elastic members of the group is substantially constant along the entire length of the receptacle.

According to the invention, the shape of the receptacle is adapted to the shape of each elastic member of one group of elastic members in order to ensure kinematic guidance of each of the elastic members during compression thereof. This ensures better control of hysteresis and of the operation of the damper.

According to preferred embodiments, the damper can exhibit one or more of the following characteristics, considered alone or in combination:

The receptacle forms a bent tube whose bending radius, measured along the receptacle with respect to the center of the damper, is variable; the bending radius is measured circumferentially along the receptacle.

The cross section of the receptacle has a partly annular shape over the entire length of the receptacle.

Each receptacle has first and second angular segments having substantially constant and different average bending radii, and a third segment connecting the first and second segments.

The third segment is configured so that the walls delimiting the receptacle are continuous and preferably exhibit no breaks in slope.

The torque input member has a first and a second guide washer, the receptacle being at least partly delimited by a flanged orifice in the first and/or the second guide washer.

The elastic members are helical springs, preferably straight.

At least one, preferably both, of the first segment and the second segment is configured to ensure that, with the torque transmission device in a position corresponding to an absence of torque transmission from the torque input element to the torque output element, at least one elastic member, preferably both, is in contact with a wall of the receptacle at six different points, two of the contact points preferably being located on a radially inner wall of the receptacle and the other four points on a radially outer wall of the receptacle.

The group of elastic members has at least first and second helical springs having an identical diameter and/or differing lengths.

The group of elastic members furthermore has at least one third helical spring that has a length less than the length of the first helical spring, has a diameter less than the diameter of the first helical spring, and is disposed inside the first helical spring.

According to another aspect, the invention proposes a motor vehicle torque transmission device having:

a clutch comprising an input element coupled to a first shaft and an output element coupled to a second shaft, and a damper as described above, said damper being disposed between the output element of the clutch and the second shaft.

According to a preferred embodiment, the transmission device can have the following characteristics:

the device furthermore has a bladed impeller wheel and a bladed turbine wheel, the bladed impeller wheel being configured to hydrokinetically drive the bladed turbine wheel by means of a reactor, the clutch and the bladed turbine wheel being coupled to said output element.

BRIEF DESCRIPTION OF THE DRAWINGS

The invention will be better understood in light of the description that follows, said description referring to the attached drawings in which.

DETAILED DESCRIPTION OF THE PREFERRED EMBODIMENT(S)

Figure 1:
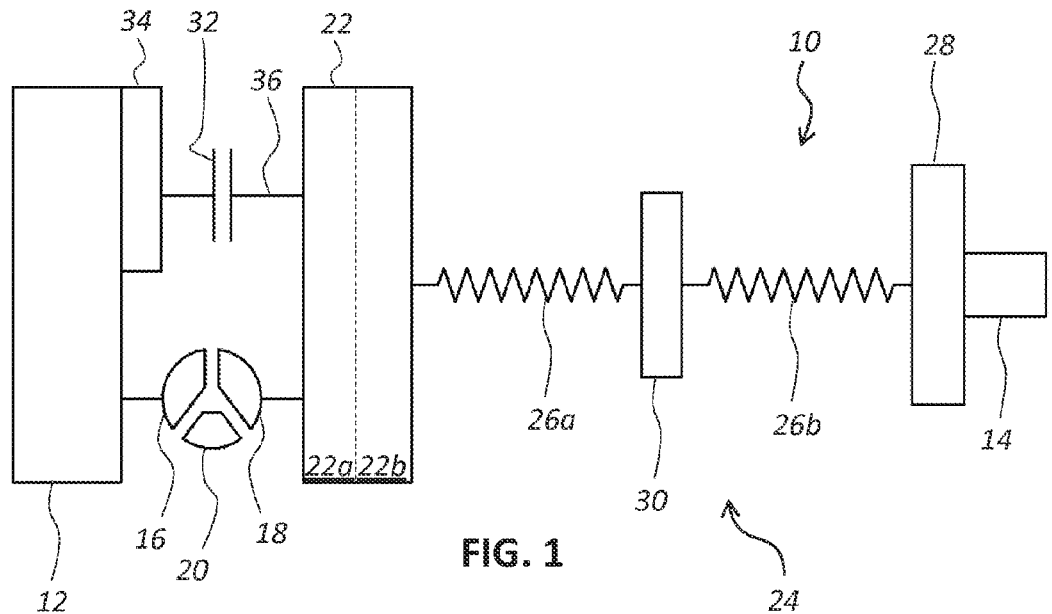
FIG. 1 schematically depicts a device for transmitting torque between an engine output shaft and a gearbox input shaft of a motor vehicle.
Figure 2:
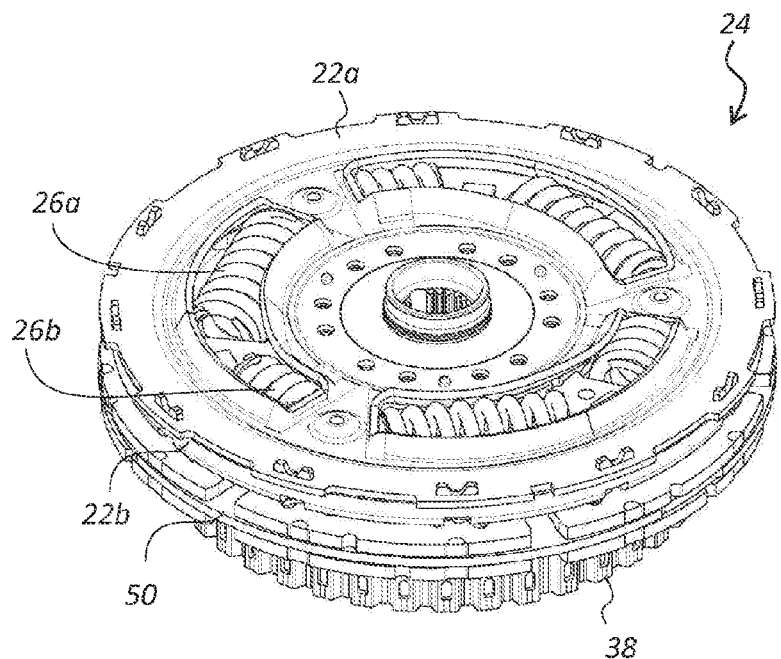
FIGS. 2 to 4 schematically depict, respectively in perspective in the assembled state, in an exploded view, and in a plan view, a damper configured to be utilized in the torque transmission device of FIG. 1.
Figure 3:
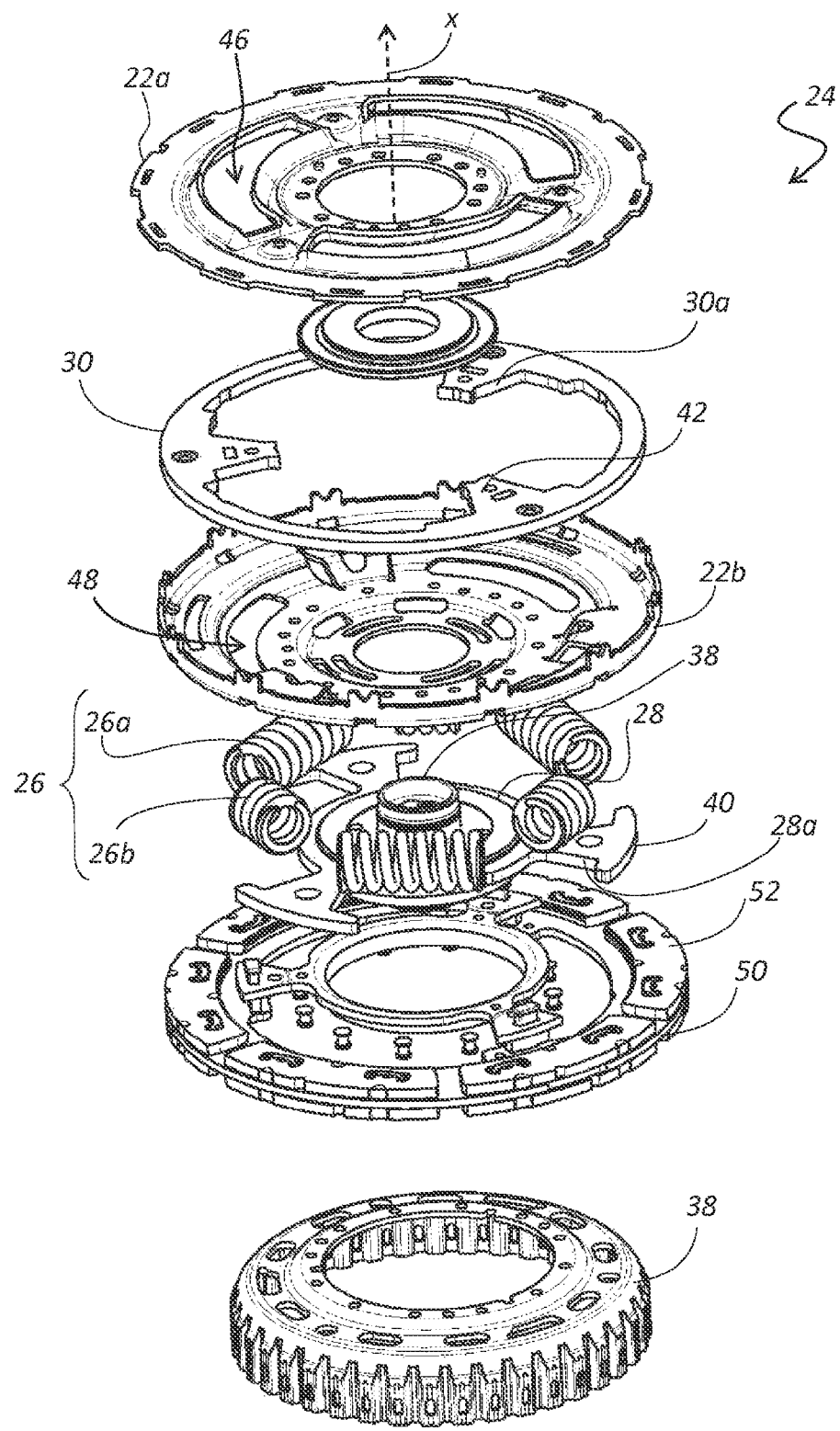
Figure 4:
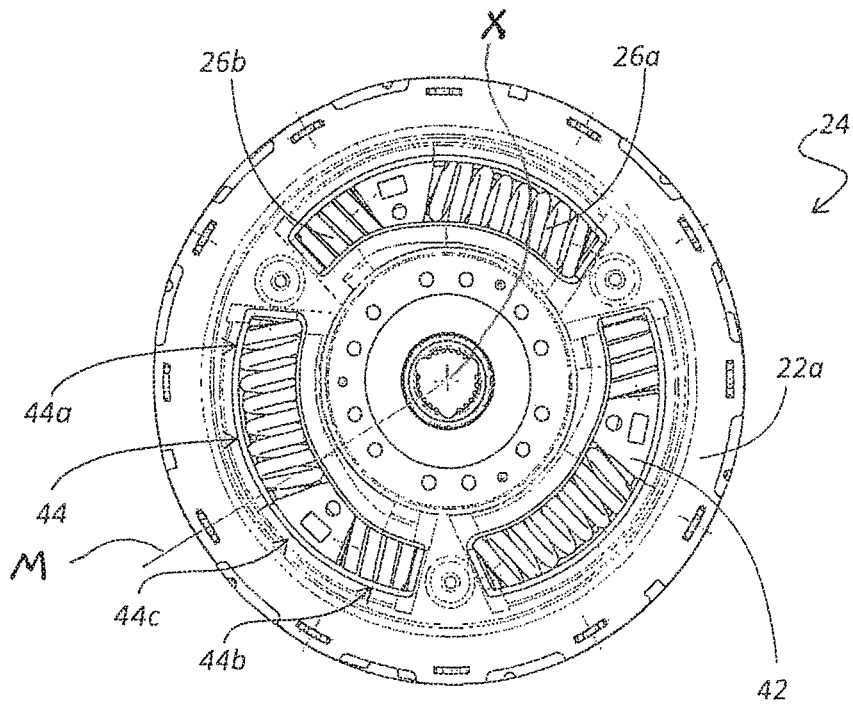

A torque transmission device 10, here a hydrodynamic torque converter, is schematically depicted in FIG. 1. A torque transmission device of this kind is utilized, for example, in a motor vehicle automatic transmission.

The torque transmission device can also, in an example that is not depicted, be a disk clutch.

Torque transmission device 10 allows torque to be transmitted from an engine output shaft 12, conventionally the crankshaft, to an input shaft 14 of a gearbox.

To do so, torque transmission device 10 can utilize two parallel pathways.

A first pathway, utilized initially, consists in utilizing a bladed impeller wheel 16 capable of hydrokinetically driving a bladed turbine wheel 18 means of a reactor 20. Impeller wheel 16 is coupled to engine output shaft 12. Turbine wheel 18 is coupled to a set 22 of two guide washers of a damper 24, which are hereinafter referred to respectively as front guide washer 22a and rear guide washer 22b. Here, for example, front guide washer 22a is made rotationally integral with turbine wheel 18. This can be achieved, in particular, by means of rivets. Damper 24, which will be described in more detail below with reference to FIGS. 2 to 5, has essentially one or more groups 26 of elastic members 26a, 26b that couple set 22 of guide washers to an annular web 28 that is rotationally integral with gearbox input shaft 14. Damper 24 also has a phasing member 30 to ensure that elastic members 26a, 26b of one group 26 act in phase. Damper 24 allows the transmission of vibration and noise from engine output shaft 12 to gearbox input shaft 14 to be limited.

According to a second pathway, torque transmission device 10 transmits the torque of engine output shaft 12 to gearbox input shaft 14 through a so-called "lockup" clutch 32, clutch 32 being, for example, of the disk type. This second pathway is utilized subsequently to the first one in order to prevent undesirable slippage between the turbine and impeller wheels in steady-state operation, i.e. after hydraulic coupling between engine output shaft 12 and gearbox input shaft 14.

Clutch 32 has an input element 34 coupled to engine output shaft 12, and an output element 36 coupled to set 22 of guide washers via a splined hub 38 (see FIGS. 2 and 3), so that damper 24 is also utilized in this case in order to transmit torque from engine output shaft 12 to gearbox input shaft 14. Splined hub 38 is in this case fastened to rear guide washer 22b, for example using rivets.

Damper 24 as illustrated in FIGS. 2 to 5, which is of the LTD type, is described in more detail below.

The two guide washers 22a, 22b of damper 24 are rotationally integral. In order to achieve this, front guide washer 22a has slots that receive tabs 23 of rear guide washer 22b.

Figure 5:
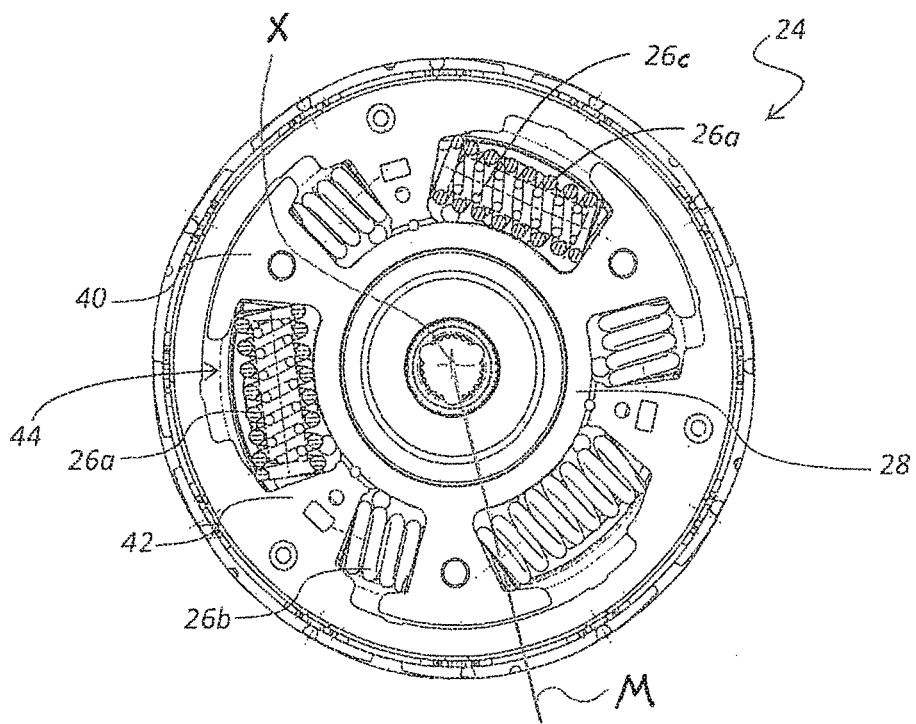
FIG. 5 is a schematic view from below of the damper of FIGS. 2 to 4, a guide washer of which has been removed.

These two guide washers 22a, 22b are elastically coupled to annular web 28 by means of groups 26 of elastic members 26a, 26b. Elastic members 26a, 26b can have differing lengths. Elastic members 26a, 26b are preferably straight wound springs, which have greater flexibility for a given length than curved springs. Note that a third helical spring 26c, which has a length shorter than the length of the first helical spring 26a and a diameter smaller than the diameter of first helical spring 26a, can be disposed inside the first helical spring 26a, as best shown in FIG. 5.

The phasing member 30, rotationally integral with, i.e., non-rotatably connected to, the guide washers 22a, 22b, ensures that the elastic members 26a, 26b of each group act in phase. Thanks to the compression of the elastic members 26a, 26b, the torsional vibrations of the engine output shaft 12 are filtered and are not transmitted, or at least are transmitted at an attenuated level, to the gearbox input shaft 14.

Compression of the elastic members 26a, 26b is effected between two abutment surfaces:

one 28a that is integral with web 28, formed here by the sides of a radial tab 40 of web 28;

the other 30a integral with phasing member 30, formed here by the sides of a radial tab 42 of phasing member 30.

Note that in this instance the two abutment surfaces 28a, 30a are appreciably tilted with respect to a radial direction, for example at an angle of between 2° and 6°.

In addition, in order to prevent or at least reduce slippage of the elastic members in the event of compression, each group 26 of elastic members 26a, 26b is received in a receptacle 44 located between the two guide washers 22a, 22b. The walls of this receptacle 44 are formed by guide washers 22a, 22b in order to permit guidance of elastic members 26a, 26b during any compression thereof, and thereby to prevent slippage of said elastic members 26a, 26b. An internal volume of receptacle 44 located between guide washers 22a, 22b is available for installation of the elastic members.

For this, the receptacle walls formed by guide washers 22a, 22b (and thus the receptacle itself) are asymmetrical with respect to a median radial plane of the receptacle 44 passing through an axis of rotation X (shown in FIG. 3) of the damper 24, i.e. with respect to a plane that is oriented along and perpendicular to a radius of damper 24 and divides receptacle 44 into two parts of identical length. The cross section of the internal volume of receptacle 44 varies along the receptacle. In a preferred example, the section measured along receptacle 44 is decreasing. It is thus possible to implement a receptacle allowing more efficient guidance of the elastic members during compression thereof. Specifically, the inventors have found that receptacles extending along a torus segment, i.e. having a constant radius of curvature with respect to the center of the damper, are generally provided to allow efficient guidance of the larger of the two elastic members that are utilized. In this case, however, the elastic member having a smaller dimension is then subject to slippage, since guidance of that elastic member by the receptacle walls is not satisfactory. Here, however, with asymmetrical walls, it is possible to adapt one segment of the walls to one of the two elastic members and another segment, different from the first, to the other of the two elastic members, thus ensuring appropriate guidance of both elastic members by the walls of receptacle 44.

The walls of each receptacle 44 formed by guide washers 22a, 22b can in particular be formed by flanged orifices 46, 48 in the front and rear guide washers 22a, 22b, respectively. Flanged orifices 46, 48 are formed by deformation of the surface of guide washers 22a, 22b around an opening that makes springs 26a, 26b visible. The deformation of the surface of guide washers 22a, 22b is effected in such a way that the shape of the deformed surface corresponds substantially to the shape of the springs that are received. Thanks to the presence of the openings, the cross section of receptacle 44 has a partly annular shape.

Each receptacle 44 is thus in the shape of a bent tube having a variable bending radius with respect to the center of damper 24. A first segment 44a of receptacle 44, intended to receive a larger spring 26a, has a larger radius of curvature than a second segment 44b intended to receive a smaller spring 26b. A third segment 44c of receptacle 44, located between first and second segments 44a, 44b, ensures that the surfaces delimiting receptacle 44 are regular, in particular continuous, preferably with no breaks in slope. More specifically, in this case the abutment surfaces of springs 26a, 26b, defined by the flanged orifices, are bent and form torus segments.

Preferably at least one of first segment 44a and second segment 44b is configured to ensure that, with the damper in a position corresponding to an absence of torque transmission, at least one elastic member or spring 26a, 26b is in contact with a wall of the receptacle, in particular with the walls of flanged orifices 46, 48, at six different points. In further preferred fashion, first segment 44a and second segment 44b are configured to ensure that, with the damper in a position corresponding to an absence of torque transmission, both elastic members or springs 26a, 26b are in contact with a wall of the receptacle, in particular with the walls of flanged orifices 46, 48, at six different points.

Of these six contact points, preferably two contact points are located on a radially inner wall, and the other four points on a radially outer wall, of the receptacle. Also preferably, of these contact points, three are arranged on the front guide washer and three are arranged on the rear guide washer.

Groups 26 of elastic members are thus interposed functionally between guide washers 22a, 22b and annular web 28 in order to damp vibrations proceeding from the engine output shaft and prevent them from propagating to the gearbox input shaft. This damping is achieved by compressing elastic members 26a, 26b. This compression of elastic members 26a, 26b is implemented while limiting slippage of elastic members 26a, 26b.

In addition, the phasing member 30 is also rotationally integral with, i.e., non-rotatably connected to, a plate 50 carrying flyweight pendulums 52, which contributes to vibration damping.

The present invention is of course not limited only to the exemplifying embodiment described above.

The invention claimed is:

1. A damper for a motor vehicle torque transmission device, the damper comprising:
   a torque input element (22);
   a torque output element (28); and
   at least one group (26) of elastic members including a first elastic member (26a) and a second elastic member (26b) different from the first elastic member (26a);
   the at least one group (26) of elastic members (26a, 26b) mounted between the torque input element (22) and the torque output element (28), the at least one group (26) of elastic members (26a, 26b) acting oppositely to a rotation of the torque input element (22) and the torque output element (28) with respect to one another;
   the elastic members (26a, 26b) of the at least one group (26) of elastic members being arranged in series to each other by a phasing member (30) so that the first and second elastic members (26a, 26b) of the at least one group (26) of elastic members deform in phase with one another;
   the at least one group (26) of elastic members being received in a receptacle (44) asymmetrical with respect to a median radial plane of the receptacle (44).

2. The damper according to claim 1, wherein the receptacle (44) forms a bent tube whose bending radius, measured along the receptacle with respect to a center of the damper, is variable.

3. The damper according to claim 1, wherein a cross section of the receptacle (44) has a partly annular shape over an entire length of the receptacle (44).

4. The damper according to claim 1, wherein the receptacle (44) has a first angular segment (44a) having a constant average bending radius, a second angular segment (44b) having a constant average bending radius different from the average bending radius of the first angular segment (44a), and a third angular segment (44c) connecting the first and second angular segments (44a, 44b).

5. The damper according to claim 4, wherein the receptacle has walls delimiting the receptacle, and wherein the third segment is configured so that the walls delimiting the receptacle are continuous.

6. The damper according to claim 1, wherein the torque input element (22) has a first guide washer (22a) and a second guide washer (22b), and wherein the receptacle is at least partly delimited by a flanged orifice (46, 48) in at least one of the first guide washer (22a) and the second guide washer (22b).

7. The damper according to claim 4, wherein at least one of the first angular segment (44a) and the second angular segment (44b) is configured to ensure that, with a torque transmission device in a position corresponding to an absence of torque transmission from the torque input element to the torque output element, at least one of the first and second elastic members is in contact with a wall of the receptacle at six different contact points, two of the six contact points being located on a radially inner wall of the receptacle and the other four of the six contact points located on a radially outer wall of the receptacle.

8. The damper according to claim 1, wherein the first and second elastic members (26a, 26b) are helical springs.

9. The damper according to claim 1, wherein the first elastic member (26a) is a first helical spring (26a) and the second elastic member (26b) is a second helical spring (26b), and wherein each of the first and second helical springs having a length different from each other.

10. A damper for a motor vehicle torque transmission device, the damper comprising:
a torque input element (22);
a torque output element (28); and
at least one group (26) of elastic members including a first elastic member (26a) and a second elastic member (26b) different from the first elastic member (26a);
the at least one group (26) of elastic members (26a, 26b) mounted between the torque input element (22) and the torque output element (28), the at least one group (26) of elastic members (26a, 26b) acting oppositely to a rotation of the torque input element (22) and the torque output element (28) with respect to one another;
the elastic members (26a, 26b) of the at least one group (26) of elastic members being arranged in series by a phasing member (30) so that the first and second elastic members (26a, 26b) of the at least one group (26) of elastic members deform in phase with one another, the at least one group (26) of elastic members being received in a receptacle (44) asymmetrical with respect to a median radial plane of the receptacle (44);
the first elastic member (26a) being a first helical spring (26a) and the second elastic member (26b) being a second helical spring (26b);
each of the first and second helical springs having a length different from each other;
the group (26) of elastic members (26a, 26b) furthermore having at least one third helical spring (26c) having a length less than the length of the first helical spring (26a), having a diameter less than the diameter of the first helical spring (26a), and being disposed inside the first helical spring (26a).

11. A motor vehicle torque transmission device (10), comprising:
a clutch (32) comprising an input element (34) coupled to a first shaft (12) and an output element (22) coupled to a second shaft (14); and
a damper (24) comprising
a torque input element (22);
a torque output element (28); and
at least one group (26) of elastic members including a first elastic member (26a) and a second elastic member (26b) different from the first elastic member (26a);
the at least one group (26) of elastic members mounted between the torque input element (22) and the torque output element (28), the at least one group (26) of elastic members acting oppositely to a rotation of the torque input element (22) and the torque output element (28) with respect to one another;
the elastic members (26a, 26b) of the at least one group (26) of elastic members being arranged in series to each other through a phasing member (30) so that the first and second elastic members (26a, 26b) of the at least one group (26) of elastic members deform in phase with one another;
the at least one group (26) of elastic members being received in a receptacle (44), the receptacle (44) being asymmetrical with respect to a median radial plane of the receptacle (44);
the damper being disposed between the output element (22) and the second shaft (14).

12. The device according to claim 11, further comprising a bladed impeller wheel (16) and a bladed turbine wheel (18), the bladed impeller wheel (16) being configured to hydrokinetically drive the bladed turbine wheel (18) via a reactor (20), the clutch (32) and the bladed turbine wheel (18) being coupled to the output element (22).

13. The damper according to claim 2, wherein a cross section of the receptacle (44) has a partly annular shape over an entire length of the receptacle (44).

14. The damper according to claim 2, wherein the receptacle (44) has a first angular segment (44a) having a constant average bending radius, a second angular segment (44b) having a constant average bending radius different from the average bending radius of the first angular segment (44a), and a third angular segment (44c) connecting the first and second angular segments (44a, 44b).

15. The damper according to claim 3, wherein the receptacle (44) has a first angular segment (44a) having a constant average bending radius, a second angular segment (44b) having a constant average bending radius different from the average bending radius of the first angular segment (44a), and a third angular segment (44c) connecting the first and second angular segments (44a, 44b).

16. The damper according to claim 2, wherein the torque input element (22) has a first guide washer (22a) and a second guide washer (22b), and wherein the receptacle is at least partly delimited by a flanged orifice (46, 48) in at least one of the first guide washer (22a) and the second guide washer (22b).

17. The damper according to claim 3, wherein the torque input element (22) has a first guide washer (22a) and a second guide washer (22b), and wherein the receptacle is at least partly delimited by a flanged orifice (46, 48) in at least one of the first guide washer (22a) and the second guide washer (22b).

18. The damper according to claim 4, wherein the torque input element (22) has a first guide washer (22a) and a second guide washer (22b), and wherein the receptacle is at least partly delimited by a flanged orifice (46, 48) in at least one of the first guide washer (22a) and the second guide washer (22b).

19. The damper according to claim 5, wherein the torque input element (22) has a first guide washer (22a) and a second guide washer (22b), and wherein the receptacle is at least partly delimited by a flanged orifice (46, 48) in at least one of the first guide washer (22a) and the second guide washer (22b).

20. The damper according to claim 1, wherein the phasing member (30) is non-rotatably connected to the torque input element (22).

21. The damper according to claim 6, wherein the phasing member (30) is non-rotatably connected to the first and second guide washers (22a, 22b).

22. The damper according to claim 1, further including a plate (50) carrying flyweight pendulums (52) contributing to vibration damping, wherein the phasing member (30) is non-rotatably connected to the plate (50).

23. A damper for a motor vehicle torque transmission device, the damper comprising:
a torque input element (22) including a first guide washer (22a) and a second guide washer (22b);

a torque output element (28); and at least one group (26) of elastic members including a first elastic member (26*a*) and a second elastic member (26*b*) different from the first elastic member (26*a*);

the at least one group (26) of elastic members (26*a*, 26*b*) mounted between the torque input element (22) and the torque output element (28), the at least one group (26) of elastic members (26*a*, 26*b*) acting oppositely to a rotation of the torque input element (22) and the torque output element (28) with respect to one another;

the elastic members (26*a*, 26*b*) of the at least one group (26) of elastic members being arranged in series to each other by a phasing member (30) so that the first and second elastic members (26*a*, 26*b*) of the at least one group (26) of elastic members deform in phase with one another, the at least one group (26) of elastic members being received in a receptacle (44) located between the first and second guide washers (22*a*, 22*b*);

the receptacle (44) being at least partly delimited by flanged orifices (46, 48) in the first and second guide washers (22*a*, 22*b*);

the flanged orifices 46, 48 are defined by deformed portions of the first and second guide washers (22*a*, 22*b*) each having a shape corresponding to a shape of at least one of the elastic members (26*a*, 26*b*);

the elastic members (26*a*, 26*b*) being visible from an outside of the receptacle (44).

24. The damper according to claim 1, wherein the phasing member (30) is interposed circumferentially between the elastic members (26*a*, 26*b*) of the at least one group (26) of elastic members.

25. The damper according to claim 1, wherein the median radial plane of the receptacle (44) passes through an axis of rotation X of the damper.

\* \* \* \* \*